May 4, 1965 R. EBERHART 3,181,215
SAFETY BELT BUCKLE
Filed March 28, 1963 3 Sheets-Sheet 1

INVENTOR.
RAY EBERHART
BY *Hobbs & Easton*
ATTORNEYS

May 4, 1965  R. EBERHART  3,181,215
SAFETY BELT BUCKLE
Filed March 28, 1963  3 Sheets-Sheet 3

INVENTOR.
RAY EBERHART
BY Hobbs & Easton
ATTORNEYS

United States Patent Office 3,181,215
Patented May 4, 1965

3,181,215
SAFETY BELT BUCKLE
Ray Eberhart, 317 E. Jefferson Blvd., Mishawaka, Ind.
Filed Mar. 28, 1963, Ser. No. 268,837
8 Claims. (Cl. 24—75)

The present invention relates to buckles, and more particularly to buckles for safety belts for use in automobiles, airplanes, and other passenger vehicles.

In recent years, an extensive effort has been made to have seat belts installed in all automobiles, particularly in the front seats and, in some states, laws and regulations have been enacted requiring safety belts in all new automobiles sold in the state. There has been substantial reluctance or resistance to installing the belts and to using them after installation since the belts are often uncomfortable to the passenger and cause the clothes to become wrinkled, and the buckles used on the belts have frequently caught on to and pinched the passenger's clothes, resulting in damage to the garments and wearing apparel. Damage to the garments has been particularly serious with fur coats and other garments having fur trimmings in that the fur becomes caught on protrusions on the buckle or in the buckle operating mechanism, especially if these parts are on the back or inner side thereof, thus often tearing the fur, either by accident or by necessity, in disengaging the buckle from the fur and the garment.

Further, the buckles have been bulky and heavy and have projected away from the wearer's body, sufficiently to be uncomfortable to the wearer. From the safety standpoint, these prior belts have likewise been unsatisfactory in that most of them have no infallible means which will warn the wearer or driver of the vehicle that the belt buckle has initially been defectively locked or latched and thereafter that the buckle has inadvertently become unbuckled. Further, the protrusions on the buckle, including the operating levers, often constitute a hazard in the event of an accident by providing a cutting edge or prong which can effectively wound the wearer as his body is thrust forward under heavy impact against the buckle during the accident. It is therefore one of the principal objects of the present invention to provide a compact, strong and rugged buckle for safety belts, which will automatically warn or signal the wearer that the buckle has not been securely locked or latched when the belt is initially placed around the wearer, and that the buckle has been inadvertently operated or manipulated, releasing the buckle and rendering the belt ineffective, and which can be readily and conveniently operated in the event of an emergency to release the belt and permit the passenger to escape from the vehicle.

Another object of the present invention is to provide a safety belt buckle which will fit snugly against the body of the wearer and which does not contain any protrusions or buckle operating parts on the inner side thereof, capable of inflicting an injury to the wearer's body or to the wearer's clothes in the event of an accident, and which is so constructed and designed that the operating parts thereof are held firmly in place and prevented from rattling whether the buckle is locked or unlocked.

Still another object of the invention is to provide a relatively simple and highly reliable safety belt buckle which is so constructed and designed that the web or strap of the belt enters or is connected to the buckle at the two ends rather than on the rear side where it could easily pinch or tear the wearer's clothes and can easily be adjusted to securely hold the wearer without causing any discomfort, and which does not contain any protrusions, recesses or operating parts capable of tearing, abrading or otherwise damaging the wearer's clothes.

A further object is to provide a buckle of the aforesaid type having male and female parts, which is so constructed and designed that the two parts are automatically and rapidly separated when the buckle is operated to release the belt, and which can be locked by merely pushing the two parts together without operating or moving any external levers or mechanisms to completely and effectively lock or latch the buckle.

Additional objects and advantages of the present invention will become apparent from the following description and accompanying drawings, wherein.

Figure 1:
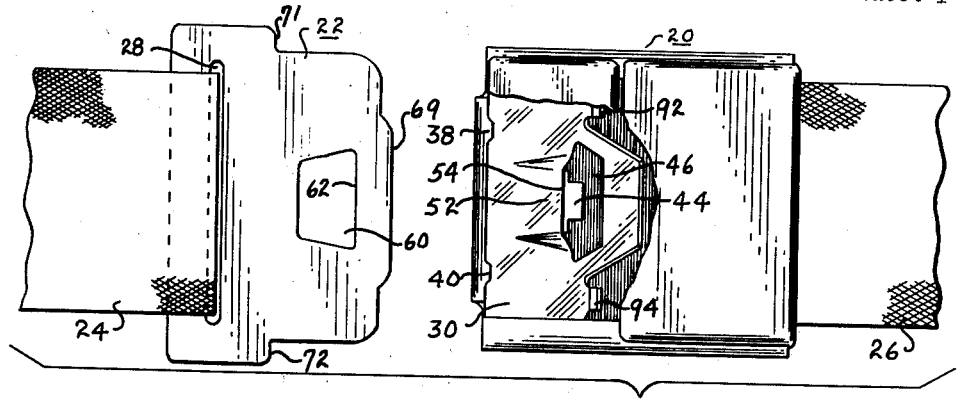
FIGURE 1 is a front elevational view of the present buckle showing the male and female portions thereof disengaged and showing said portions connected to the two sections of the belt web.

Referring more specifically to the drawings and to FIGURE 1 in particular, numeral 20 designates generally the female portion of the present buckle and numeral 22 the male portion thereof separated from the female portion, and 24 and 26 designate the web sections connected to the male and female portions, respectively. The two web sections of the safety belt are secured by fixtures attached to the ends (not shown), which in turn are secured to suitable anchor bolts or fixtures in the floor or frame of the vehicle. The manner and means by which the web portions 24 and 26 are secured to the vehicle do not form a direct part of the present invention, and hence will not be described in detail herein. The end of web section 26, shown in FIGURE 1, extends through an adjustment means in the female portion and projects laterally therefrom, and the end of web section 24, as shown in FIGURE 1, is looped through a slot 28 of the male portion and the free end thereof firmly and permanently stitched or otherwise joined to the remainder of the web section.

Figure 6:
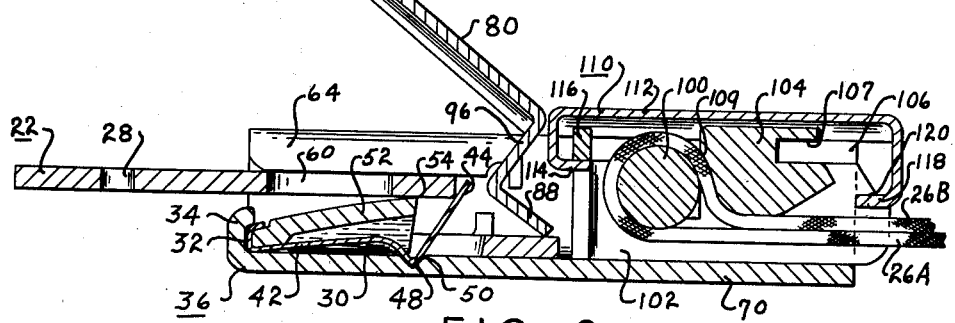
FIGURE 6 is an enlarged horizontal cross sectional view of the buckle shown in the preceding figures, the section being taken on line 6—6 of FIGURE 5 and illustrating the buckle in one operating position.
Figure 7:
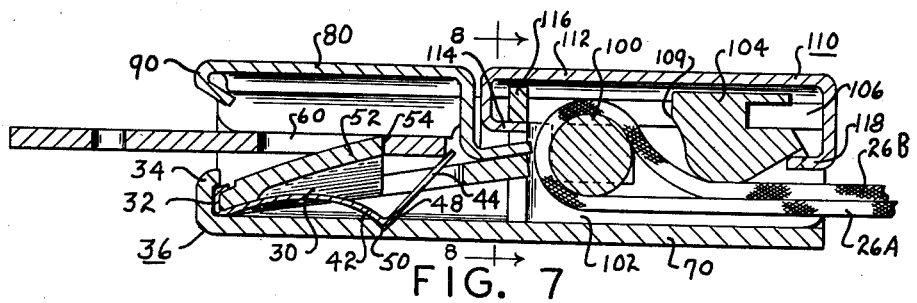
FIGURE 7 is an enlarged horizontal cross sectional view of the buckle shown in the preceding figures, the section being taken on line 7—7 of FIGURE 5 and showing the buckle in another operating position.
Figure 8:
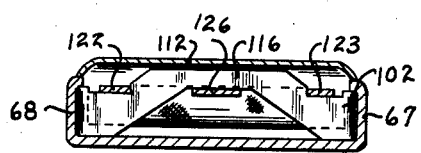
FIGURE 8 is a vertical cross sectional view of the buckle taken on line 8—8 of FIGURE 7.
Figure 5:
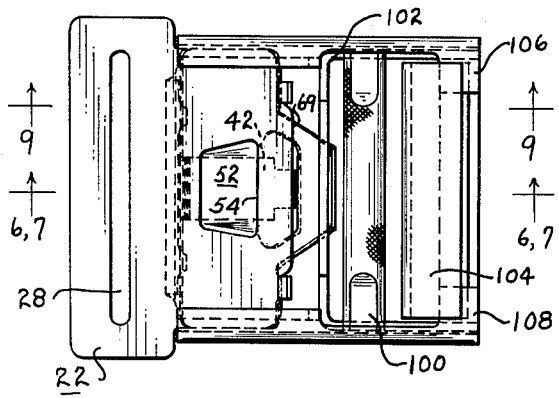
FIGURE 5 is a front elevational view of the present buckle with the front covers thereof shown in broken lines in order to illustrate more effectively the relationship of the operating parts constituting the buckle, the male and female portions being shown engaged.
Figure 2:
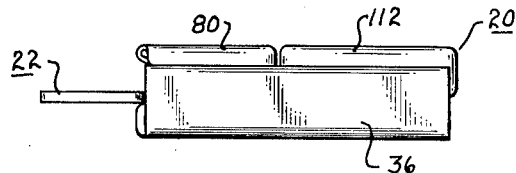
FIGURE 2 is a side elevational view of the present buckle showing the male and female portions connected.
Figure 9:
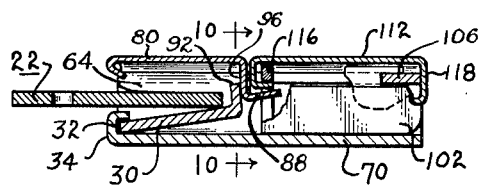
FIGURE 9 is a horizontal cross sectional view of the buckle, the section being taken on line 9—9 of FIGURE 5.
Figure 3:
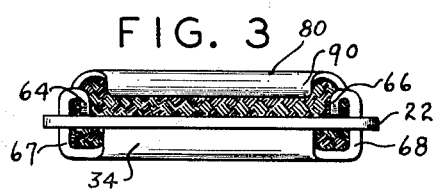
FIGURE 3 is an end elevational view of the present buckle as seen from the end in which the male portion is connected to the female portion.
Figure 4:
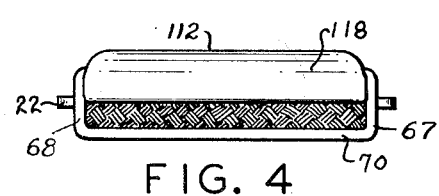
FIGURE 4 is an elevational view of the end of the buckle opposite to that shown in FIGURE 3.
Figure 10:
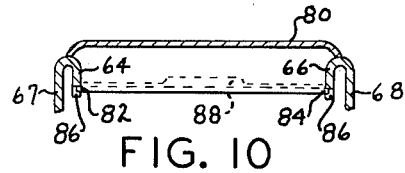
FIGURE 10 is a fragmentary cross sectional view taken on line 10—10 of FIGURE 9.
Figure 11:
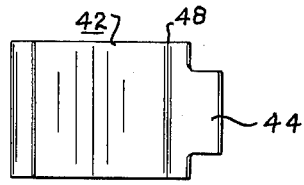
FIGURE 11 is an enlarged elevational view of a spring operating mechanism utilized in the present buckle.
Figure 12:
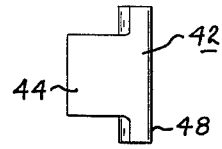
FIGURE 12 is an end elevational view of the spring operating mechanism shown in FIGURE 11.
Figure 13:
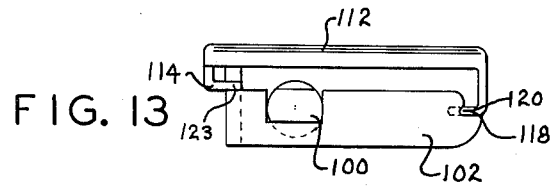
FIGURES 13, 14 and 15 are side and rear elevational and cross sectional views, respectively, of the web securing frame, the section being taken on line 15—15 of FIGURE 14.
Figure 15:
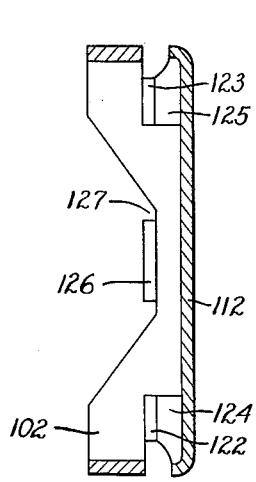
Figure 14:
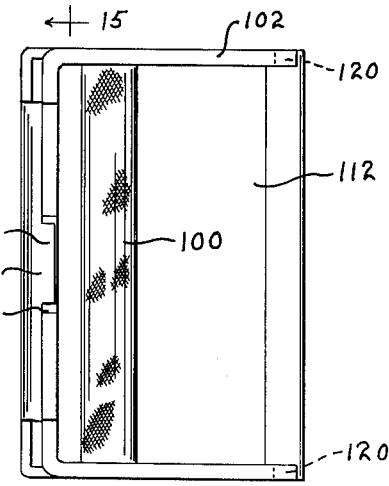

The latch mechanism of female portion 20 of the buckle is best shown in FIGURES 5, 6 and 7, consisting of a locking lever 30 seated in a groove 32 adjacent upturned flange 34 of buckle body 36. The buckle, which pivots in grooves 32, is held securely therein by two inwardly extending lugs 38 and 40 on the inner side of flange 34. Lever 30 is adapted to move from its locked position, shown in FIGURE 7, to its unlatched position, shown in FIGURE 6, and the lever assumes the position shown in FIGURE 7, whether or not the male portion 22 is inserted in or removed from the female portion, except during the locking and unlocking operations. Lever 30 is yieldably urged between the locked and unlocked positions by a spring operating mechanism 42, one end of which is seated over the outer end of lever 30 and the other end of which is provided with a finger 44 extending upwardly through slot 46 in lever 30, where it is engaged by male portion 22 as the male portion is inserted in the buckle. The spring, which is best seen in FIGURES 6, 7, 11 and 12, is also provided with a downwardly extending protrusion or rib 48 which seats in a V-shaped groove 50 in the bottom of the internal side of body 36 and thereby retains lever 30 in place with the outer edge thereof properly seated in groove 32. Operation of lever 30 between the positions shown in FIGURES 6 and 7 distorts the spring to provide the yieldable force required to operate lever 30 and to eject male portion 22 from engagement with the lever, without becoming dislodged from groove 50, as will be more fully described hereinafter. The lever 30 is provided with an upwardly or forwardly extending boss 52 of wedge-shaped construction, the boss sloping forwardly and inwardly to provide a rigid locking shoulder 54 on the inner end of said boss for holding male portion 22 in locked position.

The male portion 22 is a flat member having a hole or slot 60 therein with an edge 62 for engaging shoulder 54 when portion 22 has been fully inserted in portion 20 of the buckle. Body portion 36 of buckle portion 20 is provided with inwardly extending flanges 64 and 66 on the top and bottom sides 67 and 68 thereof, and buckle portion 22 is sufficiently wide to slip beneath and engage the inner edge of the two flanges when portion 22 is inserted in body 36. It is seen that when portion 22 is inserted in the end of body 36, the forward end 69 of portion 22 slides along tapered boss 52, while the edges thereof are held firmly beneath flanges 64 and 66, thereby urging lever 30 downwardly or toward back 70 until edge 62 slips inwardly over shoulder 54. Thereafter, boss 52 and lever 30 snap upwardly under the influence of spring 42, locking portion 22 firmly on the inner side of boss 52. As the forward edge 69 of portion 22 approaches the inner end of its movement, it engages finger 44 and places the finger and the adjacent portion of spring 42 under tension, thus holding portion 22 firmly against shoulder 54 and preventing rattling or any other undesirable noise while the buckle is either in its locked or unlocked position. The full inner movement of portion 22 is determined by shoulders 71 and 72 on the side edges of portion 22. The finger 44 of spring 42 is placed under sufficient tension when portion 22 is fully seated that, upon release of portion 22 by lever 30, portion 22 is forcibly ejected from body 36, thus completely unlatching the buckle and signalling to the wearer that the two portions 20 and 22 have been disengaged and the belt fully released. Thus, it is seen that, should the buckle become inadvertently unlatched, the wearer is effectively notified by the full disengagement of the two parts from one another.

Lever 30 is operated to unlatch and disengage portion 22 by lever 80, which is designed to form a part of the front cover of female portion 20, lever 80 being pivoted on outwardly extending pins 82 and 84 seating in slots 86 in each of the two flanges 64 and 66. The lever is provided with an inwardly extending arm 88 for engaging the inner edge of lever 30 and urging said lever downwardly from the position shown in FIGURE 7 to the position shown in FIGURE 6. The forward edge of lever 80 is provided with a rolled edge extension 90 which serves as an effective grip for pivoting the lever in the manner illustrated in FIGURE 6, and, in order to hold the cover firmly in place when lever 30 is in its latching position, lugs 92 and 94 on the lever yieldably engage the inwardly extending portion 96 of the cover.

The web 26 consists of the main portion 26A which is anchored at the unseen end to the vehicle floor or frame, and the tail portion 26B which is secured to buckle portion 20 by a mechanism consisting of non-rotatable shaft 100 supported by a U-shaped frame 102, the web being placed around said shaft and under a bar 104 rigidly supported on lugs 106 and 108 on side walls 67 and 68 of body 36. The bar has an outwardly facing slot 107 along the edge thereof for receiving the two lugs 106 and 108, and a contoured inner face 109 for engaging web portion 26B. Frame 102 is movable in body 36 longitudinally to the right and left, as illustrated in FIGURES 5, 6 and 7, and carries shaft 100 therewith for moving the shaft toward and away from bar 104. When tension is placed on web portion 26A, the frame 102 is automatically pulled to the right, causing the tail portion 26B around shaft 100 to be firmly clamped between the shaft and bar, thus securely holding the web from slipping. The surface of bar 104 facing shaft 100 is contoured to clamp web 26 effectively against shaft 100, the shaft preferably being knurled or otherwise scored to prevent slippage of the web thereon. When it is desired to adjust the belt, if only tightening is required, web tail 26B is pulled, thereby drawing web 26A around shaft 100 without serious interference from the action of shaft 100 and bar 104. However, when the web is to be loosened, it is necessary to shift shaft 100 away from bar 104 by moving frame 102 to the left, as illustrated in FIGURES 6 and 7. This releases the web portion 26B, permitting it to slide around shaft 100 to give the desired increased length to web portion 26A.

The foregoing web securing mechanism is enclosed in a cover 110, consisting of a flat upper panel 112 and an inwardly extending flange 114 held firmly by a transverse bar 116 of frame 102. The opposite end of the cover is retained in place by an inwardly extending flange 118 seating in a slot 120 in the outer end of each side of frame 102. On the inner edge of flange 114 are fingers 122 and 123 seating in slots 124 and 125 on the front side of frame 102 and finger 126 seating in slot 127 on the rear side of the frame, thus firmly securing cover 110 to the frame. It is thus seen that the length of web 26A can readily be adjusted by moving cover 110 to the right or left, and thereby moving shaft 100 toward and away from bar 104. In order to reduce the overall length of the buckle, sufficient space is provided between transverse bar 116 and back 70 to permit the free ends of lever 30 and arm 88 to slip behind or under the bar without the bar in any way interfering with the operation of either the lever or arm.

In the operation of the present belt buckle, when it is desired to place the belt around a passenger in the vehicle, the two ends of the buckle are placed in front of the wearer and portion 22 is inserted in the end of portion 20 until edge 62 has seated over shoulder 54 and boss 52 seated fully in hole 60. As the edge 69 approaches the end of its movement into portion 20, it engages finger 44 and places a tension on said finger and the adjacent portion of spring 42. With portion 22 fully seated in end portion 20, the portion 22 is firmly locked in the latter portion, thus securing the two portions securely together. Finger 44 of spring 42 holds portion 22 firmly against shoulder 54 and thereby prevents rattling or other undesirable noise. The web is then adjusted by shifting cover 110, frame 102 and shaft 100 to the left, as illustrated in FIGURES 6 and 7 and either web end 26A or 26B is pulled to give the desired tightness of the belt around the passenger. Upon releasing of cover 110, the pressure on web portion 26A pulls shaft 100 toward bar 104, thus firmly and effectively clamping the web in its adjusted position.

When it is desired to release the buckle, the wearer merely lifts the outer edge of cover lever 80, thus causing arm 88 to press lever 30 downwardly from the position shown in FIGURE 7 to the position shown in FIGURE 6 and permitting spring 42 to disengage edge 62 from shoulder 54 and permitting finger 44 of the spring to forcefully eject male portion 22 from female portion 20, thus fully and automatically disengaging the buckle parts. If cover lever 80 is unintentionally lifted, inadvertently releasing male portion 22 from lever 30, spring finger 44 ejects the male portion from the female portion and effectively warns the wearer and the driver, if the wearer is in the front seat of the vehicle, that the safety belt has been released.

One of the special advantages of the present buckle is its compactness and confined and enclosed operating parts, coupled with the automatic ejection of the male portion 22 from the female portion 20 when the former is released, intentionally or inadvertently, by lever 30. Spring means 42, which performs the automatic ejection of the male portion, performs the additional function of urging lever 30 to its latched position, shown in FIGURE 7, and, by applying a force at the angle illustrated on the inner end of male portion 22 when this portion is in locked position, firmly seats edge 62 against shoulder 54 and lever 30 in groove 32, thereby preventing rattling or other undesirable noise or unintentional movement of the parts while the buckle is latched.

The present buckle, which is preferably formed principally from steel stampings with little machining being required to obtain proper fit between the various parts, can be effectively operated by a push button on the front thereof in place of pivoted lever 80 to operate lever 30. In this arrangement, a fixed panel replaces lever 80 and the push button projects therethrough and is preferably recessed therein. Further, other types of levers or operating mechanisms may be used to operate lever 30. While only one embodiment of the present invention has been described in detail herein, various changes and modifications may be made to satisfy requirements without departing from the scope of the invention.

I claim:

1. A buckle for a safety belt having two portions, comprising male and female portions, said female portion including a body with a solid back and two sides joined to said back and having inwardly extending flanges with open ends, one of said open ends having an inwardly extending flange, a lever in said body seated against said last mentioned flange and having a forwardly projecting boss thereon with a shoulder on its inner edge, a spring means between said back and said lever urging said lever forwardly and having a finger projecting forwardly near the inner end of said lever, a front cover for said body pivoted to the flanges on said sides near the inner end of said lever and having an arm for engaging the inner end of said lever to press said lever rearwardly against the force of said spring means, a means in said body in the end opposite said lever for releasably retaining a portion of said belt, said male portion extending across said body and engaging the flanges on said sides and including a slot with a forward edge for slipping over said boss and engaging said shoulder and having a forward edge for engaging the finger on said spring means before said slot edge engages said shoulder for ejecting said male portion from said female portion, and a means on said male portion for receiving the other portion of said belt.

2. In a buckle for a safety belt having two portions: male and female portions, said female portion including a body with a back and two sides joined to said back and having inwardly extending flanges with open ends, one of said open ends having an inwardly extending flange, a lever in said body seated against said last mentioned flange and having a forwardly projecting boss thereon with a shoulder on its inner edge, a spring means between said back and said lever urging said lever forwardly and having a finger projecting forwardly near the inner end of said lever for ejecting said male portion from said female portion, a front cover for said body pivoted to the flanges on said sides near the inner end of said lever and having an arm for engaging the inner end of said lever to press said lever rearwardly against the force of said spring means, said male portion including a bar member for slipping over said boss and engaging the finger on said spring means, and means on said female portion for holding said male portion against forward movement relative to said lever.

3. A buckle for a safety belt having two portions, comprising male and female portions, said female portion including a body was a back and two sides joined to said back and with open ends, a lever in one end of said body, a spring means between said back and said lever urging said lever forwardly and having a finger projecting forwardly near the inner end of said lever for ejecting said male portion from said female portion, a front cover for said body pivoted to the sides thereof near the inner end of said lever and having an arm for engaging the inner end of said lever to press said lever rearwardly against the force of said spring means, a means in said body in the end opposite said lever for releasably retaining a portion of said belt, said lever and male portion having an interlocking boss and slot means for holding said lever and male portion in locked position, means on said female portion for holding said male portion against forward movement relative to said lever, and a means on said male portion for receiving the other portion of said belt.

4. A buckle for a safety belt having two portions, comprising male and female portions, said female portion including a body with a back and two sides joined to said back and with open ends, a lever in one end of said body, a spring means between said back and said lever urging said lever forwardly and having a finger near the inner end of said lever for ejecting said male portion from said female portion, a front cover for said body pivoted to the sides thereof near the inner end of said lever and having an arm for engaging the inner end of said lever to press said lever rearwardly against the force of said spring means, and means on said female portion for holding said male portion against forward movement relative to said lever, said lever and male portion having an interlocking lug and bar means for holding said lever and male portion in locked position.

5. A buckle for a safety belt having two portions, comprising male and female portions, said female portion including a body with a back and two sides joined to said back and with openings adjacent the ends, a lever on one end of said body and having a forwardly projecting boss thereon with a shoulder on its inner edge, a spring means between said back and said lever urging said lever forwardly and having a finger projecting forwardly near the inner end of said lever, a means in said body in the end opposite said lever for releasably retaining one of said belt portions, and said male portion including a slot with a forward edge for slipping over said boss and engaging said shoulder and having a forward edge for engaging the finger on said spring means before said slot edge engages said shoulder for tensioning said finger to eject said male portion from said female portion when released by said lever, means on said female portion for holding said male portion against forward movement relative to said lever, and a means on said male portion for receiving the other of said belt portions.

6. A buckle for a safety belt having two sections, comprising male and female portions, said female portion including a body with a back and two sides joined to said back and with openings adjacent the ends, a lever in one end of said body and having a forwardly projecting boss thereon with a shoulder on its inner edge, a spring means between said back and said lever urging said lever forwardly, a front cover for said body pivoted at the sides thereof near the inner end of said lever and having a means for engaging the inner end of said lever to press said lever rearwardly against the force of said spring means, a means in said body in the end opposite said lever for receiving a section of said web, and means on said female portion for holding said male portion against forward movement relative to said lever, and said male portion including a slot with a forward edge for slipping over said boss and engaging said shoulder and having a means for receiving one end of said other belt section.

7. A buckle for a safety belt having two sections, comprising male and female portions, said female portion including a body with a back and two sides joined to said back, a lever in one end of said body, a spring means between said back and said lever urging said lever forwardly, a means for operating said lever, a means in said body in the end opposite said lever for receiving one end of one belt section, means for holding said male portion against forward movement relative to said lever, said lever and male portion having an interlocking lug and slot for holding said lever and male portion in locked position, yieldable means for disengaging said lever and male portion when said lever is operated to unlatch said buckle, and means on said male portion for receiving one end of said other belt section.

8. In a buckle for a safety belt: male and female portions, said female portion including a body with a back and two sides joined to said back and with open ends, a lever in one end of said body, a spring means urging said lever forwardly and having a finger projecting forwardly near the inner end of said lever for ejecting said male portion from said female portion, and a means for operating said lever, said lever and male portion having an interlocking lug and bar for holding said lever and male portion in locked position.

References Cited by the Examiner
UNITED STATES PATENTS
2,862,268  12/58  Cushman ---------------- 24—75

FOREIGN PATENTS
464,786  8/28  Germany.

DONLEY J. STOCKING, *Primary Examiner.*